J. F. SPIEGEL.
AIR BRAKE RETAINING VALVE.
APPLICATION FILED DEC. 28, 1908.
939,928.
Patented Nov. 9, 1909.
2 SHEETS—SHEET 1.
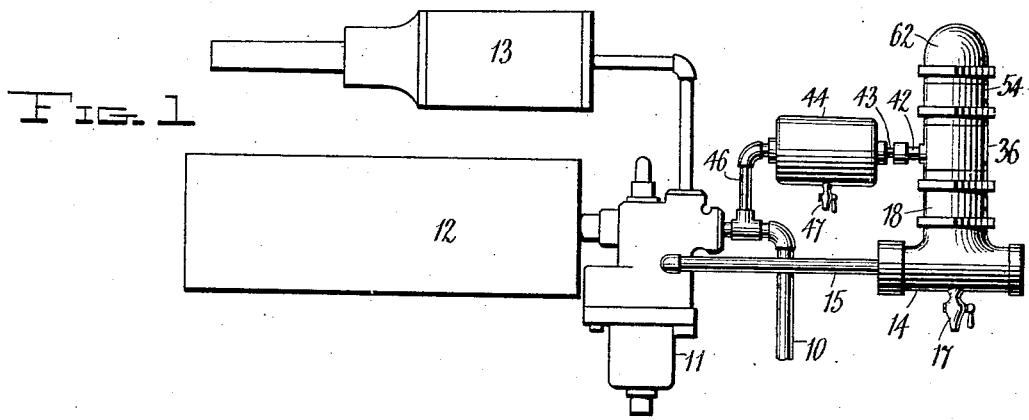
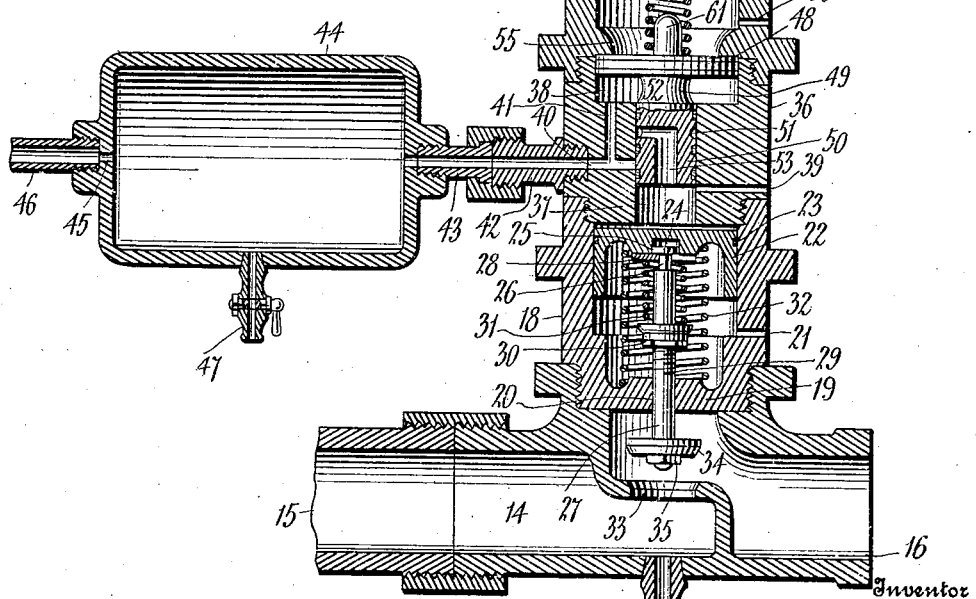

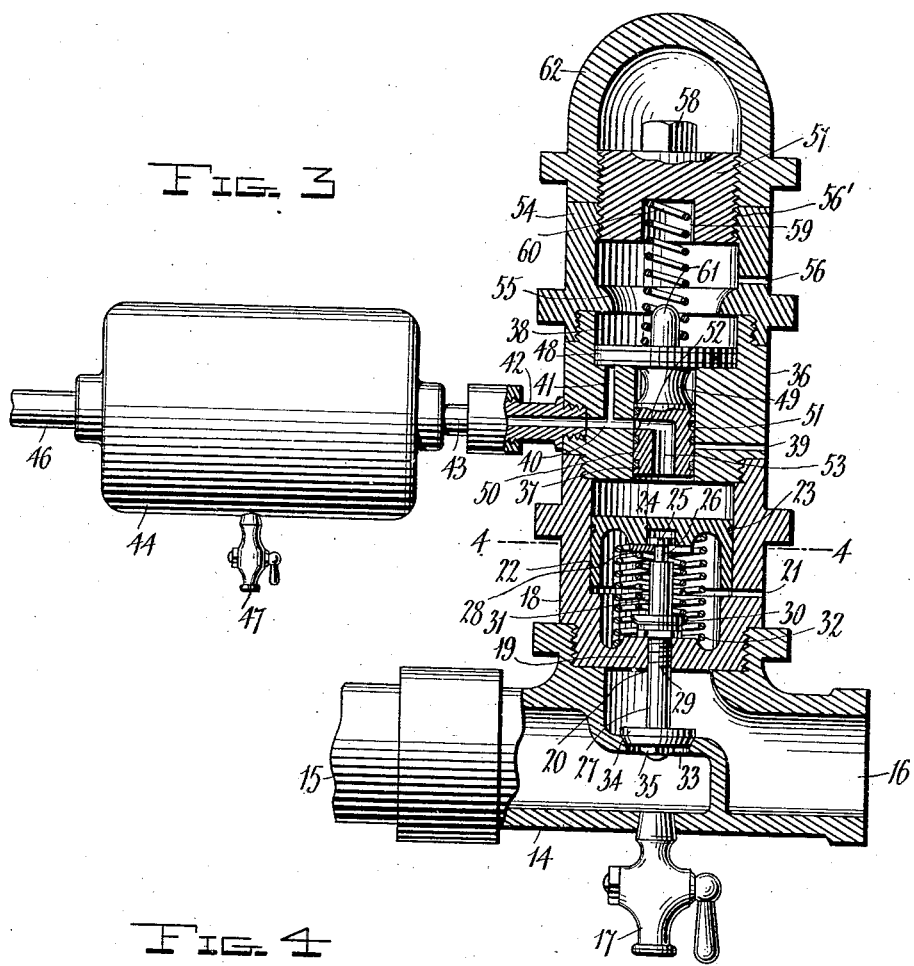

UNITED STATES PATENT OFFICE.

JOSEPH FRANKLIN SPIEGEL, OF GALETON, PENNSYLVANIA, ASSIGNOR OF ONE-FOURTH TO FRED C. WILLIAMS AND ONE-FOURTH TO EDWARD A. LACY, OF GALETON, PENNSYLVANIA.

AIR-BRAKE RETAINING-VALVE.

939,928.     Specification of Letters Patent.     Patented Nov. 9, 1909.

Application filed December 28, 1908. Serial No. 469,527.

*To all whom it may concern:*

Be it known that I, JOSEPH FRANKLIN SPIEGEL, a citizen of the United States, residing at Galeton, in the county of Potter, State of Pennsylvania, have invented certain new and useful Improvements in Air-Brake Retaining-Valves; and I do hereby declare the following to be a full, clear, and exact description of the invention, such as will enable others skilled in the art to which it appertains to make and use the same.

This invention relates to air brake systems such as are commonly used on trains of cars and has special reference to a retaining and releasing valve for such a system which will act as an automatic retainer and a uniform release valve.

The main spirit of this invention is to automatically and uniformly control brake cylinder pressure from the brake cylinder to atmosphere and to cause a uniform release of the remaining pressure retained in brake cylinder in final release from the brake cylinder through triple exhaust and through automatic retaining valve to the atmosphere. This is accomplished by a variation of train pipe pressures throughout a train and by different positions of the engineer's automatic brake valve. These retaining valves may be adjusted to any pressure desired that is not in excess of the brake cylinder pressure. During the time the retainers are automatically holding brake cylinder pressure by means of the engineer's brake valve, the train pipe and auxiliary reservoirs are recharging.

One object of the invention is to improve the general construction of such a valve.

Another object of the invention is to provide a valve of this character in which the brakes along the entire length of a train may be uniformly retained and released by means of the engineer's automatic brake valve.

A still further object of the invention is to provide, in connection with an improved valve of this character, a reservoir so arranged that the valve will not be subjected to violent fluctuations and to cause a uniform release to all brakes through a train.

With the above and other objects in view, the invention consists, in general, of an improved form of retaining valve and an improved form of connection therefor to insure the true working of the valve.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation of a valve constructed in accordance with this invention together with the adjacent portions of the usual air brake mechanisms. Fig. 2 is a vertical sectional view through the valve and its reservoir, the parts being shown in one position. Fig. 3 is a view similar to Fig. 2 with the parts shown in another position. Fig. 4 is a detail sectional view on the line 4—4 of Fig. 3.

In Fig. 1, which is partly diagrammatic, the numeral 10 indicates the train line, 11 indicates a triple valve of any desired construction, 12 is the auxiliary reservoir, and 13 the brake cylinder.

The device embodying the present construction comprises a valve body 14 which is connected at one end to the exhaust 15 of the triple valve and at the other end opens to the atmosphere as indicated at 16. This valve body is provided with the usual drip cock 17. Mounted above the valve body is a bonnet 18 provided with a diaphragm 19 having an aperture 20 centrally located therein. The bonnet 18 is provided with an exhaust port 21 for purposes to be hereinafter described. Within the bonnet 20 is mounted a piston 22 provided with the usual packing 23 and having a central recess 24 arranged to receive the head 25 of a reduced portion 26 of a valve stem 27 which is held to slide through the aperture 20. This head 25 is held within the recess 24 by means of a plate 28 suitably secured to the under side of the piston around the recess. The reduced portion 26 is of such dimensions longitudinally that the piston is free to move slightly therealong and on this account the recess 24 is made deeper than the thickness of the head 25. The stem 27 is threaded as indicated at 29 and upon this threaded portion is mounted a collar nut 30. A spring 31 surrounds the upper portion of the valve stem between the piston 22 and the collar nut 30. This spring normally holds the piston in the position indicated in Fig. 2 with reference to the valve stem, while at the same time any pressure exerted on the upper side of the piston will move the valve stem by pushing against the spring. There is thus a resilient connection between said valve stem and the piston actuating the same. In order to hold the piston normally in the position shown in Fig. 2 with relation to the bonnet there is provided a spring 32 which surrounds the valve stem, being spaced therefrom, and extends between the under side of the head and the apertured diaphragm 19.

Within the valve body 14 is provided a valve seat 33 and a valve 34 is held upon the stem 27 by means of a nut 35. The valve 34 and piston 22 are so proportioned, relative to their areas, that the piston is of considerably greater area than the valve. On this account when pressure is admitted above the piston 22 the valve will be closed, or partially so depending on the degree of pressure thus admitted. As the piston moves downward to close the valve the air contained within the bonnet 18 escapes through the exhaust port 21 before mentioned.

Above the bonnet 18 is mounted a cylinder 36 which is provided with a bore 37 of relatively small diameter and communicating directly with the opening in the interior of the bonnet 18. Above this small bore is a larger bore 38. A port 39 affords communication between the small bore 37 and the outside atmosphere. A port 40 extends from said small bore at a point above the port 39 and is preferably located diametrically opposite the latter port. This port 40 has a branch 41 forming a communication with the larger bore 38.

Secured to the cylinder 36 in communication with the port 40 is a nipple 42. This nipple is connected to a section of pipe 43 which in turn is connected to a reservoir 44. This reservoir 44 has at one end a very small port 45 and a branch pipe 46 extends from the train line to this port. The reservoir 44 is also equipped with the usual drain cock 47.

Within the cylinder 36 is a piston provided with a large head 48 having suitable packing and arranged to closely fit the large bore 38. This piston is provided with a stem 49 which connects with a small piston 50 provided with suitable packing and closely fitting the small bore 37. Around the small piston 50 and between two of the packing rings is an annular groove 51 which communicates by means of a port 52 with a central bore 53 opening from the end of the piston into the small bore 37 of the cylinder.

Mounted upon the cylinder 36 is a cap 54 provided with an internal annular flange 55 which serves to limit the upward movement of the piston 48. This cap is also provided with a port 56 to maintain the pressure within the cap at that of the atmosphere. The interior of the upper portion of this cap is threaded as indicated at 56' and an adjusting plug 57 provided with the usual square end 58 is screwed therein. This adjusting plug is further provided with a central recess 59 in the bottom face thereof and a spring 60 has one of its ends held in this recess and the other end held upon a pin 61 formed on the piston 48. A locking cap 62 is held upon the upper end of this plug and is adapted to act as a lock nut for the plug while at the same time protecting the working parts of the valve from malicious interference.

Considering now the operation of this device: when the usual pressure for running is maintained in the train line and auxiliary reservoir, the same pressure will be maintained in the reservoir 44. This will cause the piston 48 to maintain the position shown in Fig. 2 and the valve 34 will accordingly be wide open. As soon, however, as pressure in the train line is reduced to set the brakes, the pressure in the reservoir 44 will also be reduced and by reason of the small size of the port 45 this pressure will be reduced very slowly and uniformly. Owing to the reduced pressure in the reservoir 44 the spring 60 will force the piston 48, and with it the piston 50, downward until the annular groove 51 is positioned opposite the port 40. Now sufficient pressure will still remain in the reservoir 44 so that air will pass from that reservoir through the port 52 and the central bore 53 into the small bore 37 of the cylinder 56. This will cause the piston 22 to move downward against the resistance of the spring 32 and will close the valve 34 down upon its seat to a greater or less degree depending upon the pressure of the air in the reservoir 44.

This device will be noted to be capable of great nicety of adjustment and ease in repairs.

It is obvious that minor changes may be made in the form and construction of the invention without departing from the material principles thereof. It is not, therefore, desired to confine the same to the exact form or proportions herein set forth, but it is wished to include all such as properly come within the scope of the invention.

Having thus described the invention, what is claimed as new, is:—

1. In a device of the kind described; a valve body adapted to communicate with the exhaust of the triple valve of an air brake system; a bonnet mounted on said valve body having an open upper end and an apertured diaphragm across the lower end; a valve stem slidably held in said apertures; a valve carried at the lower end thereof; a piston held in the bonnet upon the upper end of said valve stem and arranged to slide longitudinally of said stem; an adjustable collar on said stem; a spring held on said stem between the collar and the piston; a second spring held between the diaphragm and the piston; a cylinder mounted on the open end of the valve bonnet, said cylinder being provided with a relatively small bore below, a relatively large bore above, an exhaust port at the lower end of the small bore, a second port formed in the small bore, and a third port leading from the large bore to the second port; a piston provided with a head fitting the large bore, a stem, and a head fitting the small bore having an annular groove therearound, a central bore, and a port connecting the groove and bore; a closure for said cylinder; a spring held above said piston; an adjustable nut to vary the tension of said spring; and a reservoir adapted to communicate at one end with the second and third ports in the cylinder and at the other end with a train line by means of a relatively minute port.

2. In a device of the kind described, a valve body adapted to communicate with the exhaust of the triple valve of an air brake at one end and with an opening leading to the atmosphere at the other end; a bonnet mounted on said valve body; a valve stem; a valve carried at the lower end thereof; a piston held in the bonnet; an adjustable collar on said stem; a spring held on said stem between the collar and the piston; a second spring held between the diaphragm and the piston; a cylinder mounted on the open end of the valve bonnet, said cylinder being provided with a relatively small bore below, a relatively large bore above, an exhaust port at the lower end of the small bore, a second port above the exhaust port in the small bore, and a third port leading from the large bore to the second port; a piston provided with a head fitting the large bore, a stem and and a head fitting the small bore having an annular groove therearound, a central bore, and a port connecting the groove and bore; a closure for said cylinder; a spring held above said piston; an adjusting nut to vary the tension of said spring; and a reservoir adapted to communicate at one end with the second and third ports in the cylinder and at the other end with a train line by means of a relatively minute port.

3. In a device of the kind described, a valve body adapted to communicate with the exhaust of the triple valve of an air brake system at one end and with the atmosphere at the other end; a bonnet mounted on said valve body having an apertured diaphragm across the lower end, a valve in said valve body; a piston held in the bonnet; a resilient connection between said piston and valve; a spring held between the diaphragm and the piston; a cylinder mounted on the open end of the valve bonnet, said cylinder being provided with a relatively small bore below, a relatively large bore above, an exhaust port at the lower end of the small bore, a second port above the exhaust port in the small bore, and a third port leading from the large bore to the second port, a piston provided with a head fitting the large bore, a stem, and a heading fitting the small bore having an annular groove therearound, a central bore, and a port connecting the groove and bore; a closure for said cylinder; a spring held above said piston; an adjusting nut to vary the tension of said spring; and a reservoir adapted to communicate at one end with the second and third ports of the cylinder and at the other end with a train line by means of a relatively minute port.

4. In a device of the kind described, a valve body adapted to communicate with the exhaust of the triple valve of an air brake system at one end and with an opening leading to the atmosphere at the other end; a bonnet mounted on said valve body; a piston held in said bonnet; means to normally hold said piston at one end of said bonnet; a valve; a resilient connection between said piston and valve; a cylinder provided with a plurality of ports held above said bonnet; a piston valve arranged to slide in said cylinder; means normally pressing the piston valve downward; an element to adjust the last mentioned means; and a reservoir adapted to communicate at one end with two of the ports in the cylinder and at the other end with a train line by means of a relatively minute port, the pressure from said reservoir being arranged to force said piston valve upward when at a predetermined pressure.

5. In a device of the kind described, a valve body, a valve held in said valve body, a valve bonnet mounted on said vale body, a pressure actuated piston held to slide in said bonnet and provided with a centrally located recess, a valve stem provided with a reduced portion and a head adapted to be held in said recess, said reduced portion being longer than the depth of said recess, and said head being of less thickness than the depth of the recess, and a retaining plate held upon said piston head to engage the reduced portion of the valve stem and prevent separation of said stem and piston.

6. In a device of the kind described, a valve body, a valve held in said valve body, a valve bonnet mounted on said valve body, a pressure actuated piston held to slide in said bonnet and provided with a centrally located recess, a valve stem provided with a reduced portion and a head adapted to be held in said recess, said reduced portion being longer than the depth of said recess, and said head being of less thickness than the depth of the recess, a retaining plate held upon said piston head to engage the reduced portion of the valve stem and prevent separation of said stem and piston, a collar upon said valve stem, and a spring held between said collar and said retaining plate.

In testimony whereof, I affix my signature, in presence of two witnesses.

JOSEPH FRANKLIN SPIEGEL.

Witnesses:
C. E. Spod,
J. E. Hendy.